2 Sheets—Sheet 1.
J. JOUET.
Elevating or Draining Wheels.
No. 216,961. Patented July 1, 1879.
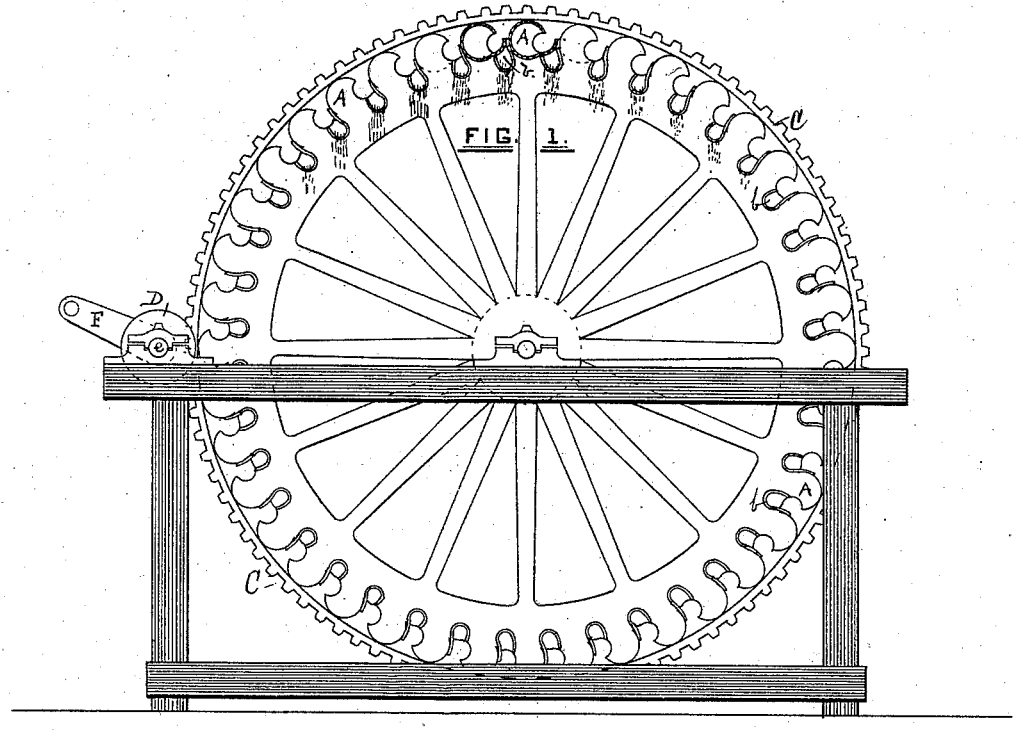
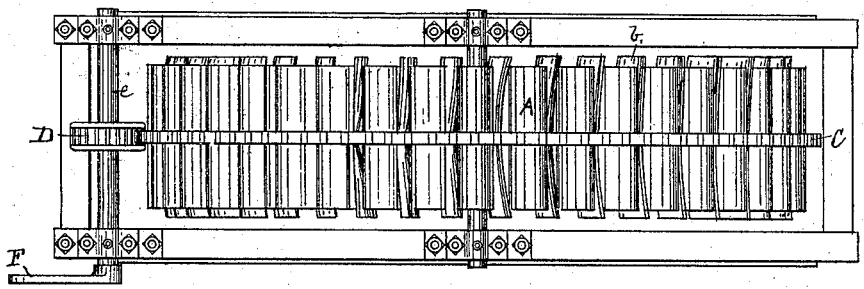
N. PETERS, PHOTO-LITHOGRAPHER, WASHINGTON, D. C.

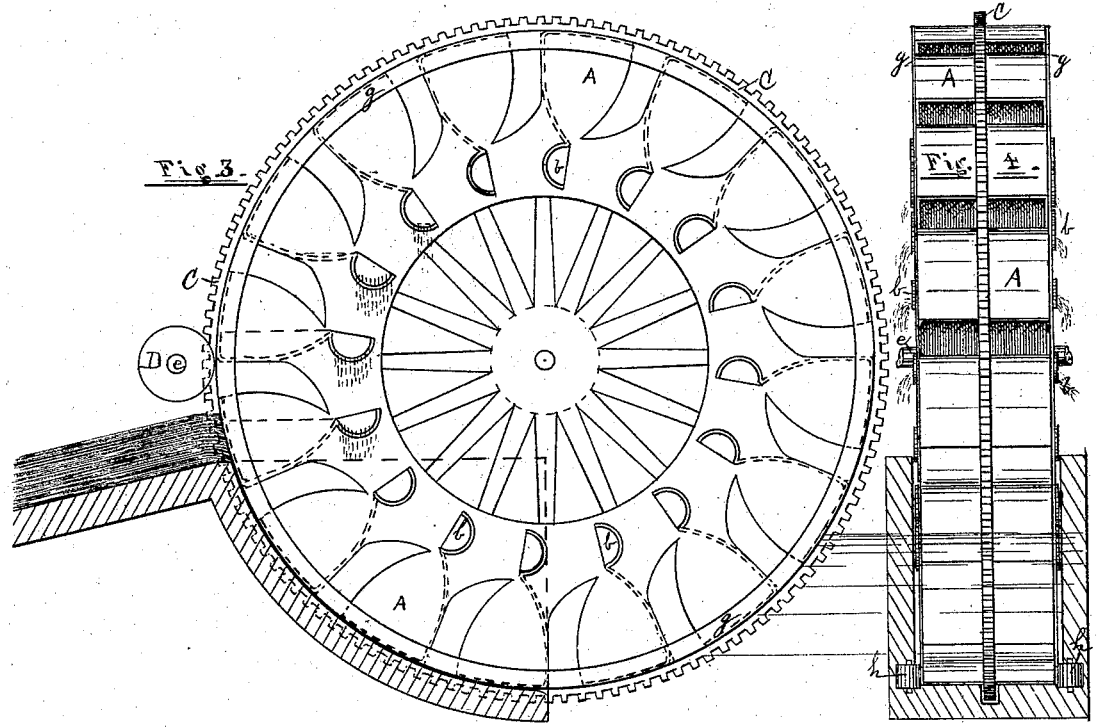

UNITED STATES PATENT OFFICE.

JOSEPH JOUET, OF NEW ORLEANS, LOUISIANA.

IMPROVEMENT IN ELEVATING OR DRAINING WHEELS.

Specification forming part of Letters Patent No. 216,961, dated July 1, 1879; application filed March 16, 1878.

*To all whom it may concern:*

Be it known that I, JOSEPH JOUET, a resident of the city of New Orleans, parish of Orleans, and State of Louisiana, have invented a certain new and useful Improvement in Elevating or Draining Wheels; and I do hereby declare the following to be a full, clear, and correct description of the same, reference being had to the annexed drawings, making a part of this specification.

This invention relates to a wheel the periphery of which is provided with a series of buckets, which are so constructed as to raise the water to a given height and discharge the same on either or both sides thereof. It is especially intended for elevating water for irrigation and other purposes, as well as for draining lands.

The nature of the invention will be readily understood by referring to the annexed drawings, whereon—

Figure 1 represents a side view of a wheel, the buckets of which are shaped for elevating purposes. Fig. 2 is a plan or top view thereof. Fig. 3 is a side view of a wheel provided with buckets for draining purposes, and Fig. 4 an edge view of the same.

The buckets A are made of sheet metal, which, for elevating purposes, are rolled so as to form about three-fourths of a cylinder each. The ends of these are afterward closed, as shown. These buckets are secured at suitable distances apart to the periphery of the wheel, with their open sides facing the direction in which the wheel is operated, in order that they may dip into and carry the water upward until it overflows into the semicircular pipes $b$. These are made to incline from one side or from the center of the wheel, so that the water which flows into them may be discharged on one or both sides of the wheel.

If so desired, troughs may be placed at each side of the wheel to receive the discharge and convey the same to any desired locality.

For draining purposes the buckets should be made somewhat in a triangular form, as shown in Fig. 3, in order that they may the more readily be relieved of their contents.

On the periphery of the wheel is secured, in a line parallel with and midway between the sides thereof, a circular rack, C, the teeth of which are engaged by a pinion, D, that is keyed or otherwise secured on a shaft, $e$, the latter provided with a pulley or crank, F, to which the power is applied for operating the wheel.

In order to give the wheel additional strength and to steady the same while in operation, its sides may be provided with wrought-iron bands, as at $g$, and the frame in which it operates with friction-rollers $h\ h'$. The latter should be so placed as to be continually in contact with the former.

Having described my invention, what I claim as new, and desire to secure by Letters Patent, is—

In combination with the wheel A, having buckets and lateral discharge-pipes, as described, the rack C, pinion D, and rollers $h\ h$, as described.

In testimony whereof I have hereunto signed my name.

JOSEPH JOUET.

In presence of—
  JOHN GRANER,
  I. C. HUBBELL.